Dec. 9, 1969

W. R. LUEBKE 3,483,419

VELOCITY MODULATION TUBE WITH R.F. LOSSY
LEADS TO THE BEAM FOCUSING LENSES

Filed Dec. 18, 1967

INVENTOR.
WILLIAM R. LUEBKE

BY Robert W Dilts

ATTORNEY

United States Patent Office 3,483,419
Patented Dec. 9, 1969

3,483,419
VELOCITY MODULATION TUBE WITH R.F. LOSSY LEADS TO THE BEAM FOCUSING LENSES
William R. Luebke, Redwood City, Calif., assignor to Varian Associates, Palo Alto, Calif., a corporation of California
Filed Dec. 18, 1967, Ser. No. 691,402
Int. Cl. H01j 23/08
U.S. Cl. 315—5.34                    5 Claims

ABSTRACT OF THE DISCLOSURE

An electrostatically-focused velocity modulated tube is disclosed employing radio frequency (R.F.) attenuator means associated with the leads to the electrostatic beam focusing lenses to suppress undesired feedback and radiation. An electrostatically-focused klystron tube is disclosed having a plurality of cavity resonators arranged successively along the beam path for interaction with the beam to produce an output R.F. signal. A plurality of electrostatic beam focusing rings are disposed periodically along the beam path in between adjacent interaction gaps of adjacent cavity resonators for focusing the beam over the elongated beam path. The focus electrodes (rings) operate at cathode potential. A plurality of leads are connected to the rings and to a harness for supplying the cathode potential to the rings. The leads are shielded by R.F. shields from the R.F. fields of the cavity resonators. An R.F. shield also extends around the harness which supplies the potential to the electrostatic lenses. The lenses have R.F. currents excited therein due to the bunching of the electron beam passing through the ring-like lenses. These R.F. currents tend to propagate along the leads to the other lenses to produce an R.F. feedback which when of proper frequency and phase can produce undesired R.F. oscillation in the output of the tube. To attenuate the feedback of R.F. energy through the electrostatic lead circuits a plurality of ferrite lead attenuators are strung over the leads to the electrostatic lenses. Each of the ferrite leads provides about one db of loss at the R.F. frequency of the tube. It is found that providing approximately 20 db of attenuation on the leads between successive beam focusing lenses is sufficient to reduce the tendency for the tube to oscillate to an acceptable level.

DESCRIPTION OF THE PRIOR ART

Heretofore, electrostatic focusing lenses have been utilized for focusing the beam of klystron amplifiers. An example of such a prior art tube is found in copending U.S. application, Ser. No. 593,422, filed Nov. 10, 1966 and assigned to the same assignee as the present invention. In such klystron amplifiers, the electrostatic potential was applied to the lenses by means of coaxial lines passing into the lenses through the tube structure. The beam focus leads were connected together and supplied with cathode potential from the cathode potential source. One of the problems with this prior art arrangement was that the current density modulation of the beam excited R.F. currents in the beam focusing lenses, and that these R.F. currents were coupled out of the tube over the leads for supplying the electrostatic beam focusing potentials. Some of the R.F. energy was radiated out into space surrounding the tube, thereby producing unwanted spurious radiation. Radio frequency energy was also coupled from one beam focusing lens structure via the potential supply leads to an upstream beam focusing lens to produce unwanted modulation on the beam. At certain frequencies within the operable bandwidth of the tube, the loop gain for this unwanted beam modulation was greater than one and the tube would be excited in an undesired parasitic mode of oscillation. Such spurious R.F. oscillations are detrimental to the proper operation of the tube and are to be avoided if possible.

Conventional coaxial line R.F. attenuators cannot be used to advantage for attenuating the R.F. power coupled onto the focusing leads due to the very high D.C. voltages employed on the leads. Moreover, the attenuator structure must be smaller than the conventional coaxial line attenuators in order to be accommodated in the space available on the leads in between adjacent beam focusing rings.

SUMMARY OF THE PRESENT INVENTION

The principal object of the present invention is the provision of an improved electrostatically-focused velocity-modulated tube.

One feature of the present invention is the provision, in an electrostatically-focused velocity-modulated tube, of radio frequency ferrite attenuating means in the lead circuits to the electrostatic beam focusing lenses to attenuate radio frequency energy propagating on the electrostatic beam focusing leads.

Another feature of the present invention is the same as the preceding feature wherein the radio frequency attenuating means comprises ferrite beads strung over the leads supplying the electrostatic potential to the beam focusing lenses.

Other features and advantages of the present invention will become apparent upon a perusal of the following specification taken in connection with the accompanying drawings.

DESCRIPTION OF THE PREFERRED EMBODIMENTS

Figure 1:
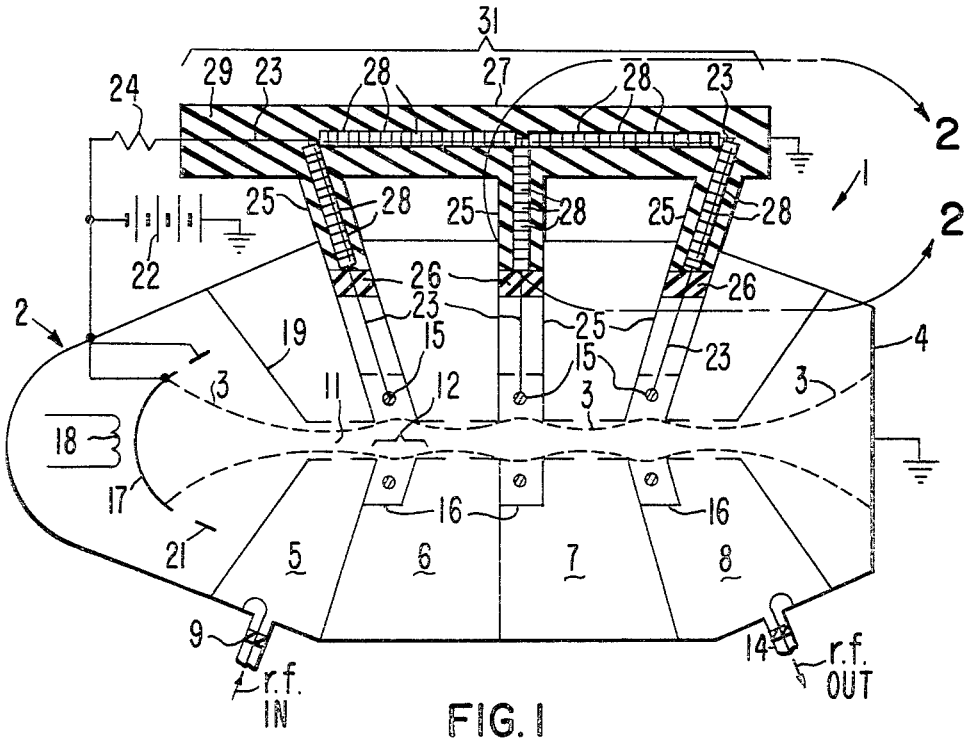
FIGURE 1 is a longitudinal schematic sectional view of an electrostatic beam focused klystron incorporating features of the present invention.

Referring now to FIGURE 1 there is shown an electrostatically-focused klystron amplifier incorporating features of the present invention. The klystron amplifier 1 includes an electron gun assembly 2 disposed at one end of the tube for forming and projecting a beam of electrons over an elongated beam path 3 to a beam collector electrode 4 for collecting and dissipating the energy of the beam. A plurality of re-entrant cavity resonators 5, 6, 7 and 8 are successively disposed along the beam path for electromagnetic interaction with the beam passable therethrough. A first one of the resonators 5 is excited with radio frequency signal wave energy via input coupler 9. The R.F. fields in the gap 11 of the first resonator 5 velocity-modulates the beam. This velocity modulation is subsequently converted into current density modulation of the beam by passage of the beam through a field-free drift space 12. The current modulation of the beam excites the next buncher cavity 6. In like manner, buncher cavities 6 and 7 further bunch the beam and the bunched beam excites electromagnetic fields in the output cavity 8. The successive buncher cavities 5, 6, 7, serve to amplify the signal energy applied to the beam and a greatly amplified signal is extracted from the output resonator 8 via output coaxial line 14.

The beam 3 is focused over its length by a plurality of electrostatic beam focusing rings or lenses 15 periodically disposed along the beam path at certain predetermined intervals therealong. The electrostatic beam focus lenses 15 are contained within lens housing structures 16 which project axially and re-entrantly into the cavities 6, 7 and 8. The housings 16 serve to shield the electrostatic lenses 15 from the R.F. circulating currents of the cavities.

The electron gun assembly 2 includes a cathode emitter 17 which is heated to thermionic emission temperature via a filamentary heater 18. The cathode 17 is operated at a negative potential relative to a centrally apertured anode structure 19 which is preferably operated at ground potential. An annular beam focus electrode 21 surrounds the emitter 17 in the region between the emitter 17 and the anode 19 for focusing the electron beam 3 through the central aperture in the anode structure 19. The focus electrode 21 and the cathode emitter 17 are preferably operated at the same negative potential as of −10 kv. with respect to the anode structure 19. The operating potential for the cathode is supplied from a power supply 22.

The electrostatic beam focusing lenses 15 are preferably operated at cathode potential and the potentials are supplied to the lenses 15 via a conductive lead 23. A current limiting resistor 24 is series connected between the source 22 and the lead 23 for limiting current drawn by the lenses 15 in case of a short in the structure. The beam focusing lenses 15 are supported within the lense housings 16 via suitable insulative structures, not shown. The leads 23 are connected to the lenses 15.

The leads 23 are shielded from the intense radio frequency fields of the cavities 6, 7 and 8 by surrounding the leads 23 with cylindrical conductive tubes 25 to form short lengths of coaxial lines extending radially inwardly of the cavities along one end wall thereof. Insulative structures 26 are hermetically sealed between the inner leads 23 and the outer shields 25 to form vacuum-tight insulative feedthrough assemblies in the vacuum envelope of the tube 1. The hermetically sealed feedthrough insulator assemblies 26 are shown in greater detail in FIGURE 2. The axially directed portions of the leads 23 are also surrounded via a hollow cylindrical conductive shield 27 which is also grounded.

Ferrite bead attenuators 28 are strung over the leads 23 to provide approximately 20 db of attenuation between successive electrostatic lenses 15. Each bead provides about 1 db of attenuation. Suitable bead material comprises a composite of sintered iron and nickel oxides such as those marketed under the trade name Ferroxcube, part number 56–590–65/4B, made by Ferroxcube Corporation of America, Saugerties, N.Y. Such beads have an inside diameter of 0.047″, an outside diameter of 0.138″ and a length of 0.118″. These beads provide wideband R.F. chokes and above 60 megacycles the impedance of the beads is substantially resistive and constant. The beaded conductive leads 23 are preferably potted into the R.F. shields 25 and 27 via a suitable insulative material 29, such as, room temperature vulcanizing silicone rubber to form an integral harness assembly 31.

Figure 2:
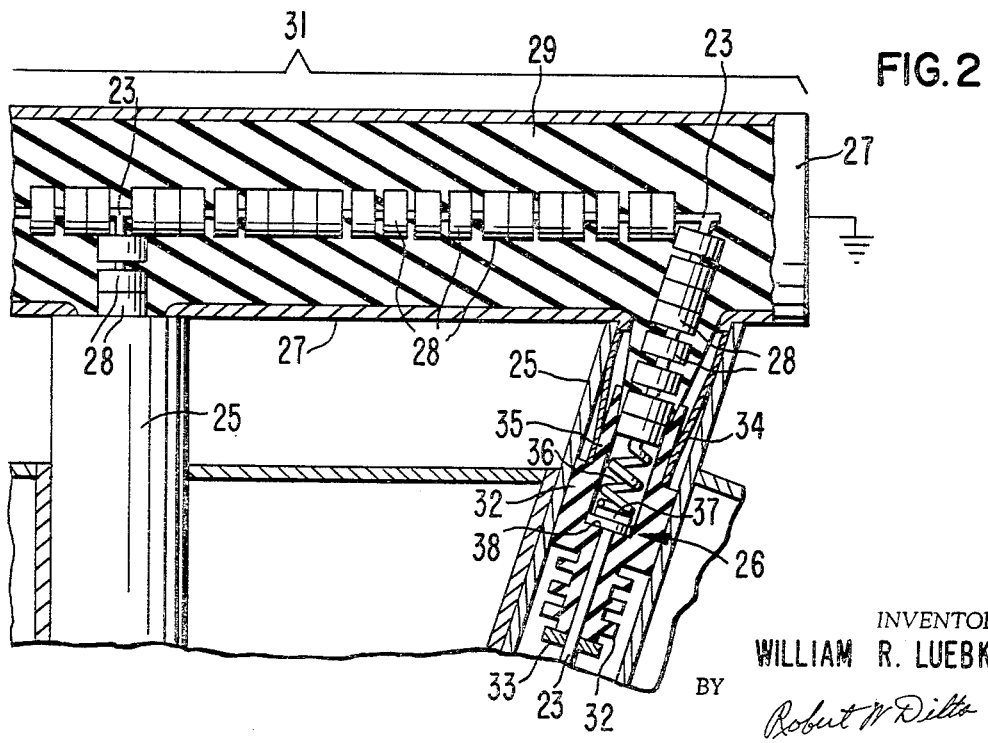
FIGURE 2 is an enlarged sectional view of a portion of the structure of FIGURE 1 delineated by lines 2—2.

Referring now to FIGURE 2 the harness 31 and feedthrough insulator assemblies 26 are shown in greater detail. Each of feedthrough insulator assemblies 26 includes a hollow cylindrical ceramic insulator member 32 which is hermetically sealed to the conductor 23 at one end via a conductive disk 33 brazed to the end of the insulator 32 and brazed at its inner diameter to the conductor 23. The other end of the insulator 32 is hermetically sealed to the conductive tube 25 via tubular conductive member 34 welded at one end to the end of the tube 25 and brazed at the other end to a shoulder 35 on the insulator 32. A length of the conductor 23 is coiled to form a spring 36 and provided with a contactor 37 at one end of the spring for making electrical contact with a head portion 38 of the center conductor 23. In this manner, the harness 31 is made such that it may be plugged into the feedthrough insulator assemblies 26 to make contact between the contactor 37 and the head 38 which forms a permanent part of the feedthrough insulator assembly 26.

In operation, the modulated beam 3 excites radio frequency currents in the electrostatic beam focusing lenses 15. These radio frequency currents are attenuated by the attenuating beads 28 to prevent feedback of radio frequency energy from one lens 15 to a preceding lens which might otherwise produce undesired feedback and oscillation of the tube.

In certain embodiments, not shown, it is desirable that separate potential supplies be provided for applying separate potentials to the various ones of the electrostatic beam focusing lenses 15. In such case, the likelihood of feedback from one lens to a preceding lens is unlikely but the beads 28 serve to prevent radiation of radio frequency energy from the leads 23. Although the attenuating beads 28 and beam focus harness 31 have been described as utilized with a 4-cavity klystron amplifier, they may also be used to advantage in other types of tubes where electrostatic focusing is employed. Examples of such other tubes would include extended interaction klystrons employing distributed field resonators, and 5-cavity electrostatically-focused klystron amplifiers.

Since many changes may be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electrostatically focused radio frequency tube, means for forming and projecting a beam of electrons over an elongated beam path; means at the terminal end of the beam path for collecting and dissipating the energy of the beam; means forming a radio frequency wave supportive structure arranged along the beam path intermediate said beam forming means and said beam collector means for electromagnetic interaction with the beam to modulate the beam with signal energy; means forming an output circuit coupled to the beam and excited by the signal modulation on the beam to extract radio frequency energy from the beam for propagation to a utilization device; means forming a plurality of electrostatic beam focusing lenses axially spaced apart along the beam path for focusing the beam through said radio frequency wave supportive structure; means forming an electrical circuit having an electrical lead connected to at least one of said electrostatic beam focusing lenses for applying an operating potential to said lens relative to said radio frequency wave supportive structure; means forming an insulative structure for insulating said lead means for D.C. potential from said radio frequency wave supportive structure; means forming a radio frequency shield structure for shielding said lead from the radio frequency fields of said radio frequency wave supportive structure; the improvement comprising; means forming a ferrite structure disposed in said electrical circuit of said lead for attentuating transmission of radio frequency energy therealong.

2. The apparatus according to claim 1 wherein said radio frequency attenuating means includes a plurality of ferrite beads strung on said lead.

3. The apparatus of claim 2 wherein said electrical lead of said electrical circuit means interconnects a plurality of said electrostatic lenses for applying the operating potential thereto; and wherein said radio frequency attenuating means is disposed in a portion of said electrical circuit of said lead which interconnects one electrostatic lens to another one of said electrostatic lenses to attenuate feedback of radio frequency energy from one lens to another along said electrical circuit of said lead.

4. The apparatus according to claim 3 including means forming a radio frequency shield surrounding said electrical lead and said attenuator beads.

5. The apparatus according to claim 4 wherein the radio frequency tube is a klystron amplifier.

No references cited.

HERMAN KARL SAALBACH, Primary Examiner

S. CHATMON, JR., Assistant Examiner

U.S. Cl. X.R.

315—5.39, 5.52; 328—265; 333—79